United States Patent [19]

Young

[11] Patent Number: 4,711,720
[45] Date of Patent: Dec. 8, 1987

[54] TANGENTIALLY STAGED HYDROCYCLONES

[75] Inventor: Grant A. Young, Tulsa, Okla.
[73] Assignee: Amoco Corporation, Chicago, Ill.
[21] Appl. No.: 888,171
[22] Filed: Jul. 18, 1986
[51] Int. Cl.[4] ............................................ B01D 17/038
[52] U.S. Cl. .................................. 210/512.2; 209/144; 209/211
[58] Field of Search ...................... 210/512.2; 209/144, 209/211; 166/68, 267, 105.1

[56] References Cited
FOREIGN PATENT DOCUMENTS
835884 5/1960 United Kingdom ............. 210/512.2

Primary Examiner—Frank Sever
Attorney, Agent, or Firm—Scott H. Brown; Fred E. Hook

[57] ABSTRACT

A hydrocyclone separation system is disclosed for separating a liquid mixture into at least two different density components. A central outlet of a primary separation chamber is in fluid communication with a tangential inlet of at least one secondary chamber via a conduit extending therebetween, whereby a rotating stream of the low density components exiting the central outlet of the primary separation chamber passes through the conduit and enters the secondary separation chamber with the same direction of rotation.

9 Claims, 3 Drawing Figures

TANGENTIALLY STAGED HYDROCYCLONES

BACKGROUND OF THE INVENTION

1. Field of the Invention

The present invention relates to a hydrocyclone separation system and, more particularly, to such a system which includes at least two hydrocyclone separation devices tangentially staged for improved separation efficiency.

2. Setting of the Invention

Vortex separators or hydrocyclones, such as the type shown in U.S. Pat. No. 3,306,461, have been utilized in the past for the separation treatment of liquid suspensions or multidensity fluids, as well as fluid/solid mixtures. In such hydrocyclones, liquid is fed tangentially into an upper cylindrical portion and, as the liquid flows through a conical lower portion, the liquid is accelerated. Centrifugal force draws the more dense components to the outer portion of the rotating column of liquid. The more dense components of the liquid are discharged through an opening in the conical lower portion, and the separated less dense components are passed upwardly through a centrally located opening.

It is advantageous to introduce the incoming liquid so that the more dense components therein have a relatively short distance to travel, because the efficiency of the hydrocyclone is a function of the ability to direct the more dense components against the inner surface of the hydrocyclone while the less dense components move towards the center and out through the central upper opening.

Further, it has been found that hydrocyclones used alone are not as efficient as a plurality of smaller hydrocyclones arranged in series. Various hydrocyclone systems have been used in the past that included several separators coupled in series. By using at least two hydrocyclones in series, the liquid processed by the second hydrocyclone has been stripped of larger solids which might plug the inlet openings of the second hydrocyclone, which is usually smaller in diameter. This is particularly important within the drilling industry, since inlet and outlet plugging are major problems in operating the preferable small diameter hydrocyclones.

One system commonly utilized is shown in FIG. 1, wherein a liquid/solids mixture is tangentially introduced into a first hydrocyclone. The less dense components of the first hydrocyclone are then introduced tangentially into a second, usually smaller, hydrocyclone. The less dense components exit the first hydrocyclone as a rotating upwardly traveling fluid stream. Within this stream, the higher density components are already at the outer periphery of the stream, i.e., the higher density components are already partially separated before they are introduced into the second hydrocyclone. In prior art series of hydrocyclones, the rotating upwardly traveling stream is passed into a conduit before entering the second vortex separator. Within this conduit, the stream's rotation is stopped or greatly diminished, thereby causing the semi-separated higher density components to be remixed prior to being reseparated within the second hydrocyclone.

The inventor hereof knows of no arrangement of hydrocyclones where the less dense components of a first hydrocyclone are introduced into a second hydrocyclone to maintain the same direction of rotation so that the higher density components are not remixed, thus increasing the efficiency of the series of hydrocyclones.

SUMMARY OF THE INVENTION

The inventor of the present invention has found that the separation efficiency of a plurality of hydrocylones connected in series can be increased by connecting the upper central outlet of a first hydrocyclone to the inlet of at least one other hydrocyclone in a tangentially staged manner.

A conduit extends from the central upper outlet of the first hydrocyclone in communication with the inlet of at least one secondary hydrocyclone, whereby a rotating stream of the low density components exiting the central outlet of the first hydrocyclone passes through the central conduit and enters at least one secondary hydrocyclone without hindering the rotation of the already separated fluids. Thereby, the separation efficiency is greatly improved.

DETAILED DESCRIPTION OF THE PREFERRED EMBODIMENT

A hydrocyclone separation system is disclosed herein for separating a liquid mixture into at least two different density components. Within the system, a primary separation chamber, such as a first hydrocyclone, and at least one secondary separation chamber, again such as a hydrocyclone, are connected via a conduit that extends from the upper central outlet of the primary separation chamber and includes a tangential outlet in communication with the tangential inlet of the at least one secondary separation chamber. The purpose of the cylindrical conduit is to pass a rotating stream of a relatively low density components exiting from the upper central outlet of the primary separation chamber through the cylindrical conduit and into the secondary separation chamber with the same direction of rotation.

Figure 1:
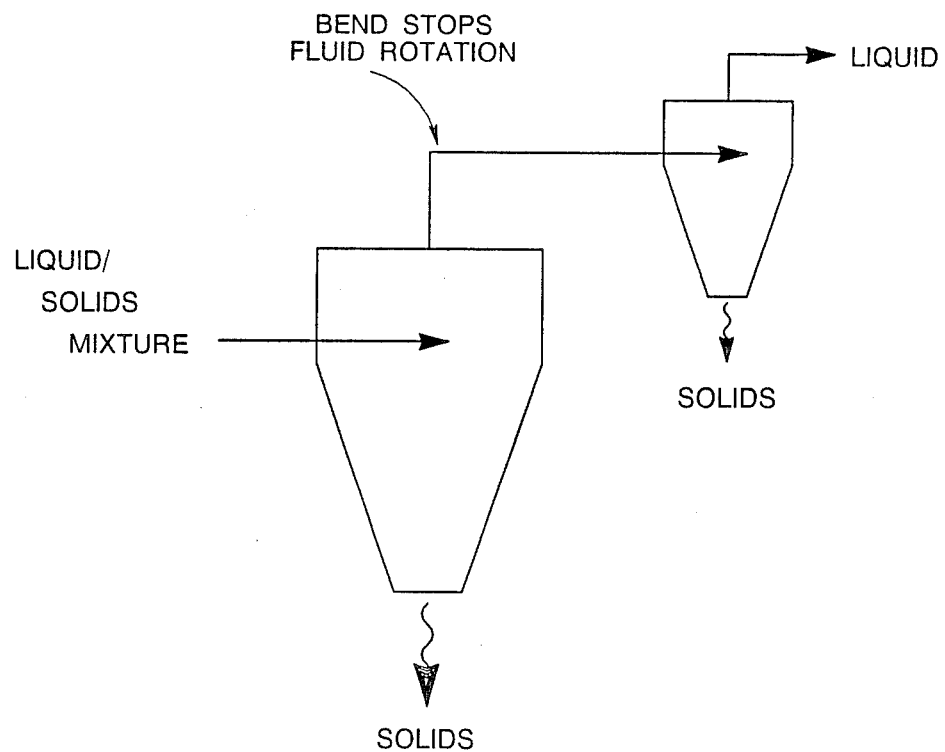
FIG. 1 is an elevational schematic view of a prior art arrangement of two hydrocyclones connected in series.
Figure 2:
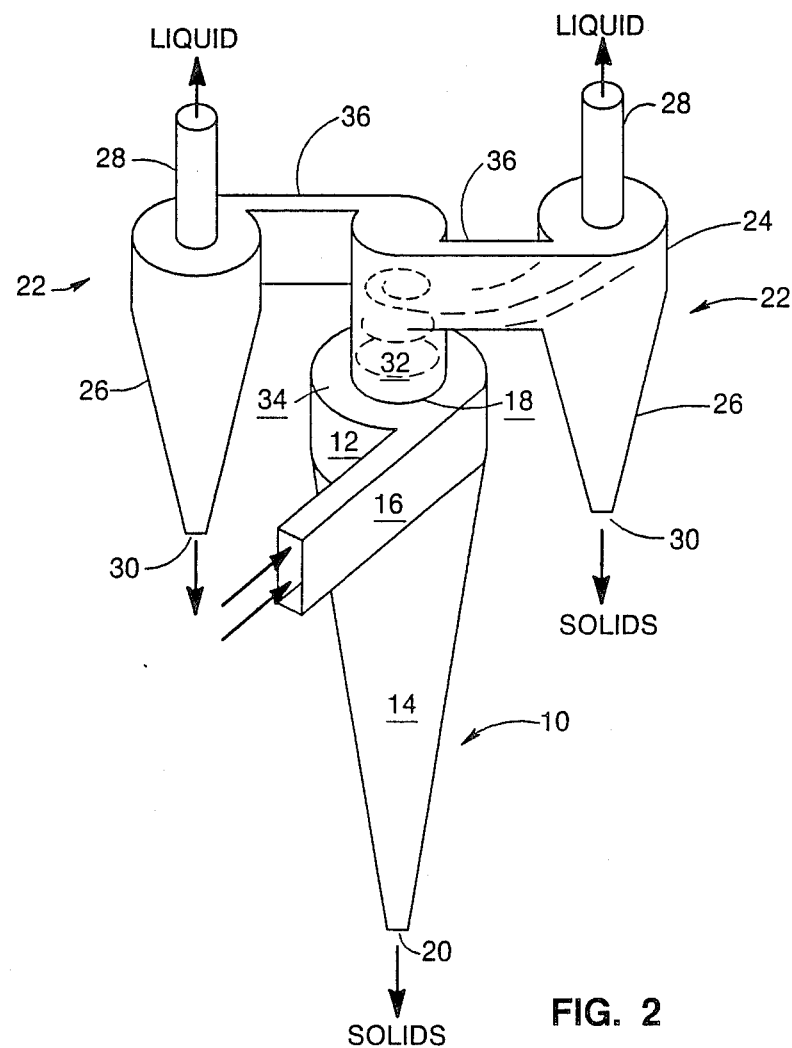
FIG. 2 is a perspective elevational view of a hydrocyclone separation system of one embodiment of the present invention.

As shown in FIG. 2, a primary separation chamber, such as a hydrocyclone, generally indicated by reference numeral 10 includes an upper portion 12, usually cylindrical in shape, and a conical lower portion 14, extending downwardly therefrom. The cylindrical upper portion 12 includes a tangentially aligned inlet 16 for admitting a liquid mixture and an outlet 18 centrally located in an upper portion thereof. The conically shaped lower portion 14 includes an outlet 20, which can be centrally located or coaxially aligned with the outlet 18 or can be tangentially located as desired.

At least one secondary separation chamber, such as another hydrocyclone, generally indicated by reference numeral 22, is in fluid communication with the outlet 18 of the primary separation chamber 10. The secondary separation chamber 22 includes an upper cylindrical portion 24, a lower conical portion 26 extending downwardly therefrom, a centrally located outlet opening or conduit 28, and a tangentially located inlet (not shown). The conical lower portion includes an outlet 30, which can be centrally located, coaxially aligned with the conduit 28, or can be tangentially located, as desired.

A conduit 32 is in fluid communication with the central outlet 18 and extends upwardly from a closed lid 34 on the upper portion of the cylindrical portion 12 of the primary separation chamber 10. The conduit 32 includes at least one tangentially aligned outlet (not shown) which conveys fluid through either a straight or preferably a curved conduit 36 for introducing the fluid into the at least one secondary separation chamber 22. The conduit 36 is preferably rectangular or square in longitudinal cross section and if the conduit 36 is straight, it should be as short as possible to prevent destruction of the rotation of the fluid. Internal helical flow enhancers, such as internal fins (shown in dotted lines) can be used to assist in maintaining the rotation of the fluids within the conduits 32 and/or 36.

As a liquid mixture is introduced under pressure through the tangential inlet 16 into the primary separation chamber 10, the liquid mixture swirls within the cylindrical upper portion 12 and descends into and within the conical lower portion 14. The swirling action produces a centrifugal force which acts upon the higher density components causing such components to move towards the inside wall of the cylindrical portion 12 and conical lower portion 14. The thus separated higher density components are then discharged through the opening 20. The majority of liquid portion and the remaining fine low density components move to the center, upwards and out of the central opening 18 and into the conduit 32. The rotating stream of the lower density components rises upwardly to exit the cylindrical conduit 32 via the outlets therein and pass through the conduit 36 into the tangential openings of the at least one secondary separation chamber 22 where the process is continued to additional hydrocyclones connected as described herein.

Figure 3:
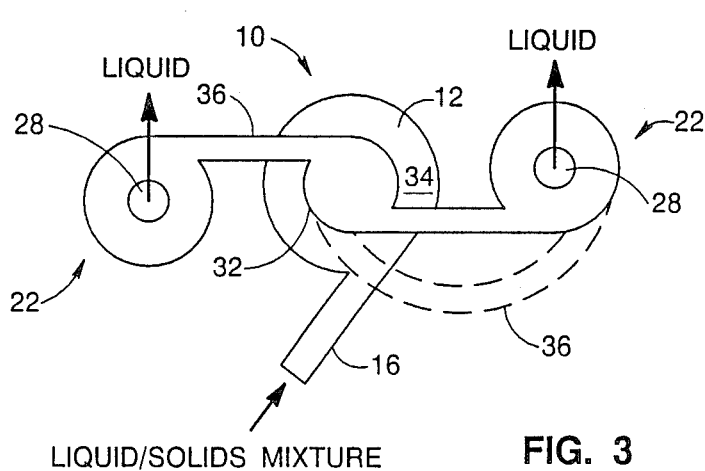
FIG. 3 is a plan view of the hydrocyclone separation system of FIG. 1.

As can be understood by viewing FIGS. 2 and 3 and from the above description, the discharging of fluid from one hydrocyclone and introducing the fluid into at least one secondary hydrocyclone in the same direction of rotation, is extremely important to take advantage of the inherent efficiencies of already having the higher density material entering the secondary hydrocyclone in such a manner that further separation can take place without having to reseparate the material because it was remixed by the prior art conduits.

The position of at least one secondary separation chamber relative to the primary separation chamber is important to minimize any mixing of the components and to not disturb the rotation of the liquid. Preferably, at least one secondary separation chamber is located as close to the primary separation chamber as possible and in an elevated position. The sizing of the conduits 32 and 36 have been found important so that the overall length of the conduits are short enough that the fluid exiting can rise out from the primary separation chamber 10 and then pass with sufficient velocity to the secondary separation chamber 22 with a minimal loss of pressure and rotational velocity. Further, the relative diameter and length sizing of the secondary separation chamber 22 to the primary separation chamber 10 can be on the order of from about 100% down to about 20% thereof; however, the sizing of the separation chambers is dictated by, among other factors, the volume, viscosity, and pressure of the inlet mixture, as well as the type of solids or material to be separated. In FIGS. 2 and 3, two secondary separation chambers are shown; however, it should be understood that at least one is required and that as many secondary separation chambers can be included as is desired.

Further, the inventor hereof has found that greater improvement in efficiency of separation can be achieved by using such hydrocyclones with as narrow a cone angle as possible. A cone angle of about 15° or less can result in greater hydrocyclone efficiencies. It has also been found that the shortest length of the cylindrical portion possible can be best for optimal solids removal and the ratio of the length of the cylindrical portion over the diameter of the cylindrical portion should be about one or less. Also, it has been found that the ratio of inlet diameter to diameter of the cylindrical portion has exactly the same effect as the ratio of the outlet diameter to diameter of the cylindrical portion on the flow rate. Combining this finding with additional findings, a ratio of inlet or outlet diameter to diameter of the cylindrical portion of about 0.5 to about 0.1 is beneficial. Preferably, the above ratio is about 0.3 to about 0.2.

The hydrocyclone system described above has been related to separation of solids from liquids as in a well drilling fluid environment; however, it can be used to separate one liquid from another liquid, solids from liquids, solids from gas and liquids from gas.

Wherein the present invention has been described in particular relation to the drawings attached hereto, it should be understood that other and further modifications, apart from those shown or suggested herein, may be made within the scope and spirit of the present invention.

What is claimed is:

1. A hydrocyclone separation system for separating a fluid mixture into at least two separate density components, and for precluding remixing of semiseparated higher density components, comprising:

a primary separation chamber having an upper portion and a conical lower portion, the upper portion including a tangential fluid inlet and a fluid outlet, and the conical lower portion including a fluid outlet;

at least one secondary separation chamber having an upper portion and a conical lower portion, the upper portion including a tangential fluid inlet and a fluid outlet, and the conical lower portion including a fluid outlet; and means for precluding remixing of semiseparated higher density components, comprising a flow direction conduit extending tangentially from the fluid outlet in the upper portion of the primary separation chamber to the tangential fluid inlet of the at least one secondary separation chamber.

2. The hydrocyclone separation system of claim 1 wherein the diameter of the upper portion of the at least one secondary separation chamber is less than the diameter of the upper portion of the primary separation chamber.

3. The hydrocyclone separation system of claim 1 wherein the length of the conical lower portion of the at least one secondary separation chamber is less than the length of the conical lower portion of the primary separation chamber.

4. The hydrocyclone separation system of claim 1 and including a plurality of secondary separation chambers.

5. The hydrocyclone separation system of claim 4 wherein the upper portion of each of the plurality of secondary separation chambers are spaced above the upper portion of the primary separation chamber.

6. The hydrocyclone separation system of claim 1 wherein the flow direction conduit comprises:
   a cylindrical conduit extending vertically from the fluid outlet in the upper portion of the primary separation chamber, and
   a tangential fluid passage conduit for passing the rotating stream from the cylindrical conduit tangentially into the tangential fluid inlet in the at least one secondary separation chamber.

7. The hydrocyclone separation system of claim 6 wherein the cylindrical conduit includes at least one helical bar along the inner surface thereof.

8. The hydrocyclone separation system of claim 6 wherein the fluid passage conduit includes at least one helical bar along the inner surface thereof.

9. The hydrocyclone separation system of claim 6 wherein the fluid passage conduit has a rectangular cross-section.

* * * * *